(12) United States Patent
Bugbee

(10) Patent No.: US 6,289,392 B1
(45) Date of Patent: Sep. 11, 2001

(54) MESSAGING SYSTEM

(75) Inventor: Kenneth J. Bugbee, London (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 08/727,520

(22) PCT Filed: Apr. 21, 1995

(86) PCT No.: PCT/GB95/00905

§ 371 Date: Oct. 21, 1996

§ 102(e) Date: Oct. 21, 1996

(87) PCT Pub. No.: WO95/29439

PCT Pub. Date: Nov. 2, 1995

(30) Foreign Application Priority Data

Apr. 21, 1994 (GB) .................................................. 9407971

(51) Int. Cl.[7] .................................................. G06F 9/54
(52) U.S. Cl. .......................................................... 709/313
(58) Field of Search ................................... 395/683, 684, 395/680; 709/310–332; 375/130

(56) References Cited

U.S. PATENT DOCUMENTS

| | | | |
|---|---|---|---|
| 4,943,978 | * 7/1990 | Rice ..................................... | 375/130 |
| 5,218,699 | * 6/1993 | Brandle et al. ...................... | 395/684 |
| 5,428,782 | * 6/1995 | White .................................. | 709/101 |
| 5,511,197 | * 4/1996 | Hill et al. ............................ | 709/328 |
| 5,524,253 | * 6/1996 | Pham et al. ........................ | 395/200.32 |
| 5,546,583 | * 8/1996 | Shriver ............................... | 395/680 |

FOREIGN PATENT DOCUMENTS

0414624 A2   2/1991   (EP) ................................. G06F/9/46

OTHER PUBLICATIONS

Mullender et al. , "Amboeba—A Distributed Operating System for the 1990s", CWI, the Center for Mathematics and Computer Science, pp. 1–2, May 1990.*

Reynolds et al. , "Design for a New Untyped IPC for Mach", OSF Research Institute, DARPA and AFMC, pp. 1–2, Sep. 1993.*

"Object Data Manager", IBM Technical Disclosure Bulletin, vol. 32, No. 10A, Mar. 1990, pp. 55–57.

* cited by examiner

*Primary Examiner*—St. John Courtenay, III
(74) *Attorney, Agent, or Firm*—Nixon & Vanderhye P.C.

(57) ABSTRACT

A messaging system for passing messages between calling programs and called programs wherein all messages are passed within a defined message block and via a message interface. The message interface has memory for storing, for each called program, an identifier and a program interface. In use, the message interface receives a message block from a calling program containing an identifier, associates the identifier with a particular called program and a particular program interface, and sends a message block to the particular called program utilizing the particular program interface.

16 Claims, 6 Drawing Sheets

MESSAGING SYSTEM

BACKGROUND OF THE INVENTION

1. Field of the Invention

The present invention relates to a messaging system for passing messages between calling programs and called programs, and in particular to a messaging system wherein all messages are passed within a defined message block, and via a message interface.

2. Related Art

Large computer systems generally comprise a number of components, or programs which interact with each other via calls. Dividing a large computer system into a number of programs is advantageous for many reasons, for example, it enables a number of computer programmers to work on the system with some degree of independence, it allows the computer system to be modified or enhanced more easily, and it allows the programs within the system to be reused in other computer systems.

The interface between the various programs within a computer system must be defined, so that a calling program is able to call a called program. In known computer systems the interface between programs is embodied in the computer code of both the calling and the called programs, thus if one calling program within a computer system is altered so as to require a change to the interface, all other programs calling the altered program must also be altered to conform to the new interface requirements.

A system which provides an interface between applications and various computers attached to a computer network is described in European Patent Application EP-A-0 414 624.

A further problem arises when, for example due to the growth of the computer system, a program needs to be moved from the initial physical hardware e.g. a mainframe, to another physical system, the interface must be enhanced to allow this. This enhancement must be made to all calling programs still resident on the initial mainframe, in addition to those programs which have been moved to the remote physical system.

SUMMARY OF THE INVENTION

According to the present invention there is provided:

a messaging system for passing messages between calling programs and called programs, wherein all messages are passed within a defined message block and via a message interface;

the message interface having memory means for storing, for each called program, an identifier and a program interface, the message block comprising a control block, having a fixed format, and a data area having a free format, the control block comprising a first portion for carrying data entity keywords, and a second portion for carrying characteristics of data items, and the said first portion remaining unaltered when a message block is passed between the message interface and a called program or a calling program, and the said second portion is altered dependent on the destination of the message block;

and, in use, the message interface;

i) receives a message block from a calling program containing an identifier;

ii) associates the identifier with a particular called program and a particular program interface; and iii) sends a message block to the particular called program utilizing the particular program interface.

Embodiments of the present invention, by providing a central repository of program interface details, reduce the amount of interface information that needs to be held by the programs themselves. Thus, for example, a calling program rather than communicating directly with a called program, will send an identifier within a defined message block to the message interface. The message interface will then determine for example, both the location and interface requirements of the called program. If the called program is located on the same physical machine a relatively simple communications protocol can be utilized. If the called program is however resident on a remote computer system, the message from the calling program can be packaged appropriately and transmitted via an appropriate communication protocol to the called program resident on the remote system.

Embodiments of the present invention furthermore are particularly suitable for use with data management systems, and by associating a tag with each data entity and utilizing the defined message block and message interface, ensure a high degree of modularity between calling and called programs, as will be apparent from the following description.

BRIEF DESCRIPTION OF THE DRAWINGS

Embodiments of the present invention will now be described, by way of example only, with reference to the accompanying figures in which.

DETAILED DESCRIPTION OF EXEMPLARY EMBODIMENTS

Embodiments of the present invention allow parts of a complex computer system, in particular a data management system, to be changed without requiring changes to, or agreement from other parts. This flexibility also allows parts of the computer system to be split off on to a physically separate computer.

Figure 1:
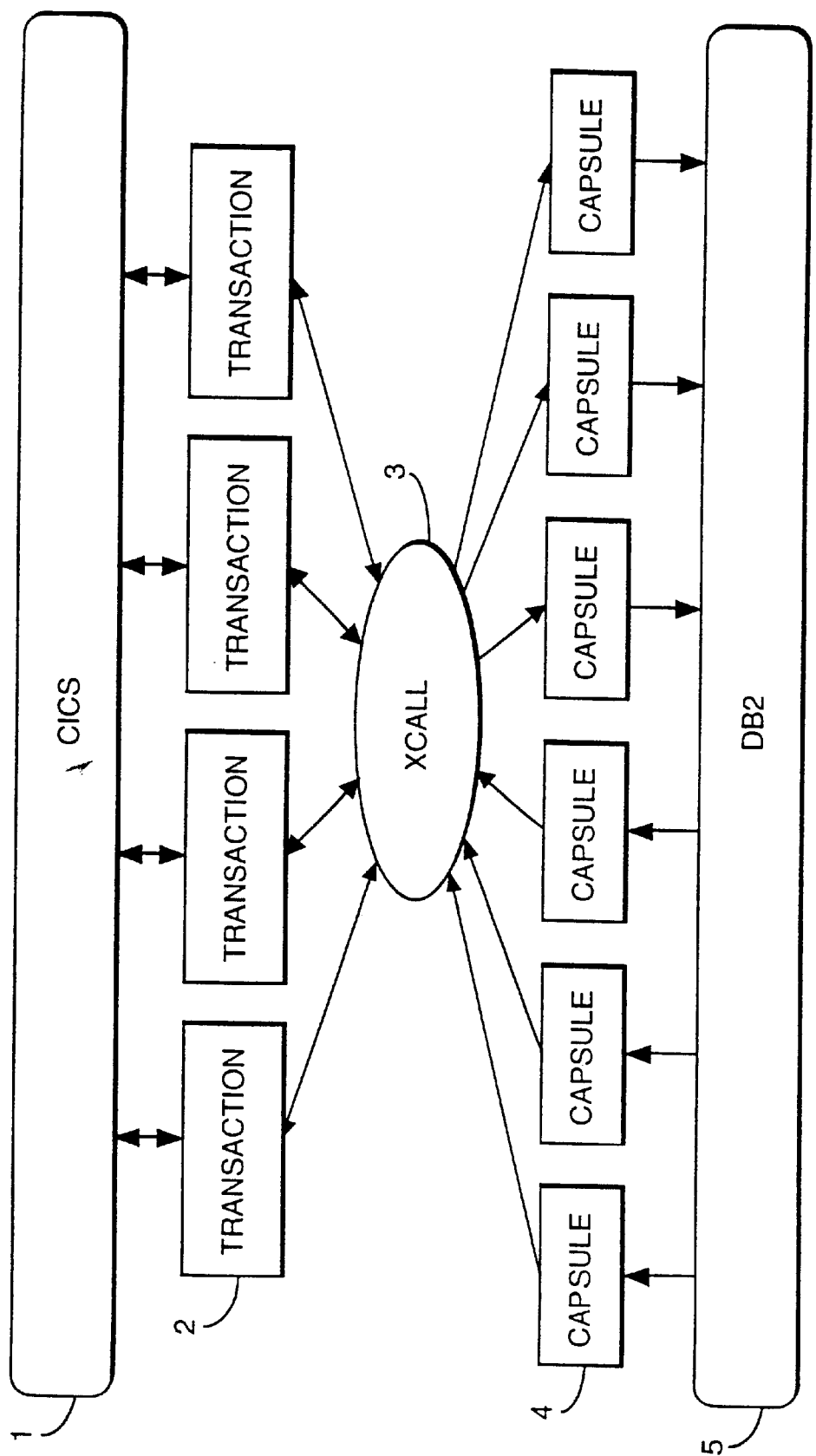
FIG. 1 is a schematic diagram showing the relationship between a messaging system according to an embodiment of the present invention and other components of a data management system.

An embodiment of the present invention used within a data management system will be described. The message interface of this embodiment comprises memory means termed ODICT (Object Dictionary) and a message interface termed XCALL. With reference to FIG. 1, the data management system comprises a transaction processing environment 1 called CICS (Trade Mark of IBM), numerous transactions 2 (written in COBOL) a messaging system 3 according to an embodiment of the present invention, numerous capsules 4, and a DB2/(TRADE MARK OF IBM)

database 5. Thus in this embodiment the transaction programs are the calling programs, and the capsule programs are the called programs. When the data management system is in use a call is not passed directly from the calling program (transaction 2) to the called program (capsule 4). The call is passed first to XCALL 3 and from there to the called program, capsule 4. XCALL 3 provides several services that essentially hide the called program from the caller and vice versa.

Figure 2:
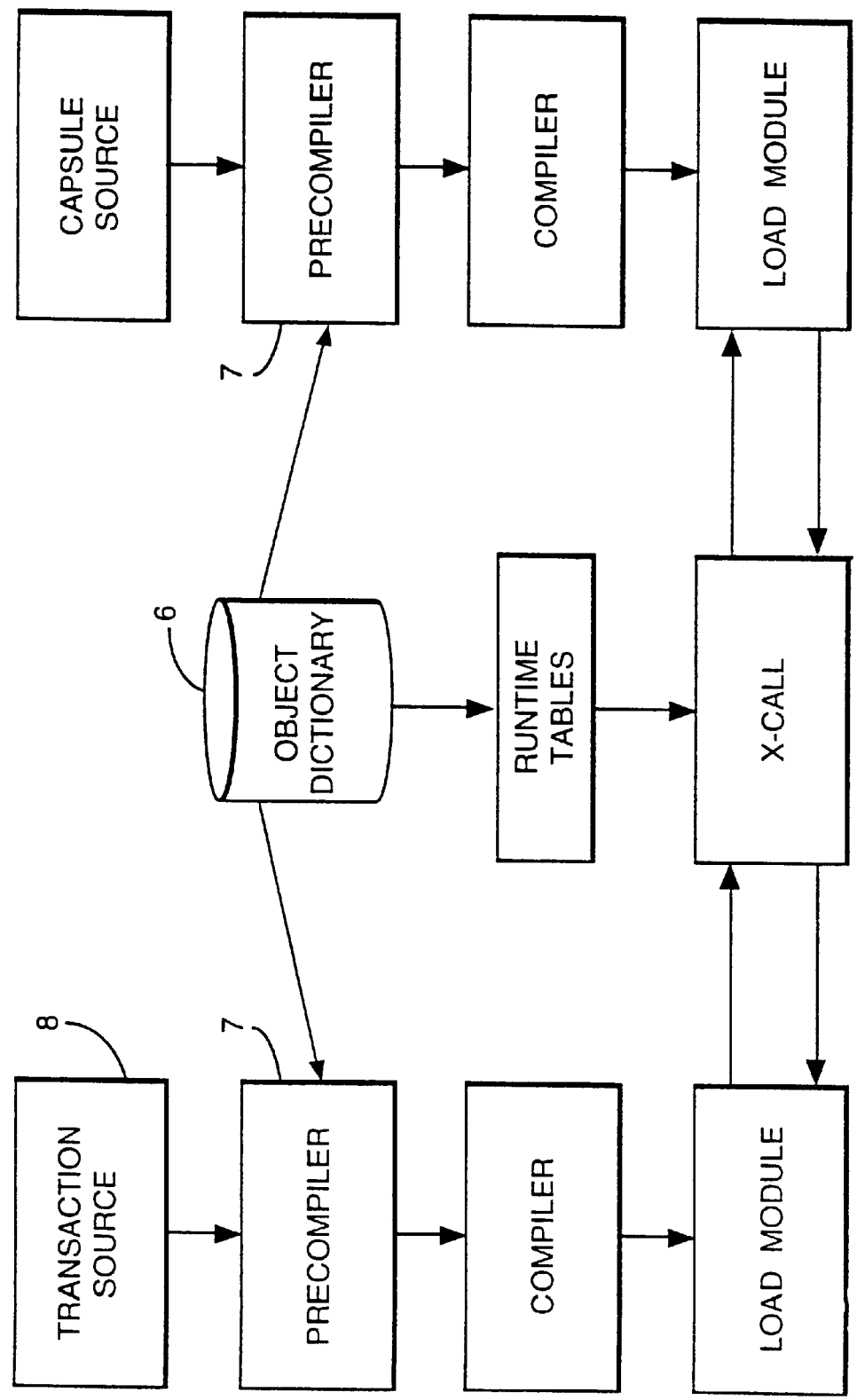
FIG. 2 is a schematic diagram showing components of an embodiment of the present invention.

With reference to FIG. 2, the message interface (XCALL) 3 is defined outside the called and calling programs in memory means 6, termed ODICT(Object Dictionary), and encoded versions of the interface definitions are used at run time to identify which data items are being passed between programs. When a program is compiled, the definitions required for the calls it makes to and/or receives from other programs are copied from the dictionary.

Only those components necessary to the specific call being compiled are copied into a calling program. The components required by all calls are copied when a called program is compiled.

If the called program is changed to provide a new or enhanced service for some caller, the hiding function of XCALL means that other callers are not affected.

XCALL moves data an attribute at a time from the calling program's data area to the called program's data area and/or back again. XCALL uses encoded descriptions of the interface in terms of data entity numbers, column numbers and column lengths copied from ODICT when the programs were compiled. This process applies in the same way if the two programs both reside on the same computer or if they are located on separate machines.

A number of terms used herein are now defined:

CAPSULE: the basic unit of XCALL. The name derives from the term encapsulation, which is the Object-Oriented community's technique of hiding data and processes from the outside world. A capsule comprises all the data definitions and METHODs for a given ENTITY. The applications program calls a method, and then XCALL uses LDS Tables constructed from ODICT to associate the method name to the appropriate capsule. Generally there is one capsule per entity, although some entities have one each for retrieval and update. Very rarely an entity is updated by more than one capsule. The call is dynamic (at runtime) rather than static (at link edit) so that changes can be made to the code it contains without recompiling or re-testing the programs which use it. The co-location of code and data also helps in problem identification and impact analysis.

DERIVED FIELD: a field that is provided by a method but is not held directly on the database. The method may calculate a value, for example given a Contract Start Date and a Contract Term, it would be useful to return a Contract End Date. A transaction could use such a field without any concern about how it was derived. Similarly it could be used in reverse: given the Contract Start and End Dates, an update method could calculate the Term. Other uses include status flags, and error flags for List type methods taking an array of input fields: on return, some mechanism is needed to determine whether data has been found for each of the input fields.

ENTITY: an identifiable type held on the database. This could be a DB2 (Trade Mark of IBM) table, or an record type, for example representing a Product or it could be a composite structure, for example an Address record type with its associated Post Code, Post Town, Thoroughfare, Locality details, and so on, such an entity comprising data from a number of DB2 tables. The name of the entity is usually the DB2 table name (if appropriate) but is limited to 18 characters. Each entity has a unique identifying keyword or entity number, and additionally a four character entity abbreviation.

ENTITY BLOCK: the data area generated by the precompiler for an entity. There are two types: the Entity Block generated by a call to a method (Method Call Entity Block), which comprises just those fields required as input and output to the method and other methods; and the full entity block (Capsule Entity Block) as generated in the Capsule, which contains all the fields in the entity. Names in the entity block comprise the entity abbreviation held on ODICT followed by the DB2 column name, with underscores replaced by hyphens and the two parts being separated by a hyphen. In the case of a Capsule entity block, this will be prefixed by "I-" for calls into the capsule (including "internal" method calls), or "C-" for entities incorporated as a result of calls to methods in other capsules. The size of the Entity Block can be determined from the COBOL compilation listing with the MAP option set.

METHOD: a procedure called by a program to execute a unique action on an entity. In DB2 terms this would be to insert a new row on a table, or to retrieve, update or delete an existing row (but note that a method may also be used to operate on DB2 (TRADE MARK OF IBM) databases or other data storage systems). A method will generally expect parameters. These include INPUT and OUTPUT data specifications, which link the entity field names (generally Database column names) with the calling program's data fields (in Working-Storage or Linkage). Fields may be described as Mandatory or Optional (at method rather than capsule level). Other parameters relate to the number of Entity instances returned, the number of input data fields in a supplied table, and so on. Methods are named according to purpose and use, notably in the use of a prefix to categorise the type of processing (GET, INS, MOD, DEL etc.).

ODICT: the Object Dictionary. This is a set of DB2 tables that store details of Entities, Capsules, and Methods. Entity information includes the fields that it comprises, including derived fields. As well as being a source of information for the applications developer, ODICT is also accessed by the precompiler to expand XCALL statements and to insert the necessary data areas. At runtime LDS tables constructed from it are used by XCALL to derive, from the requested method, the appropriate capsule to call.

PARTITIONS: logical subsections of the database, which will allow physical distribution across a variety of platforms. Although not specific to XCALL database partitioning has an impact on the design of DB2 Join-type retrieval where this is across partition boundaries.

PRECOMPILER: software that takes source containing XCALL and XC statements, translates them into the appropriate COBOL CALL statements and includes data definitions generated from the ODICT. It must be invoked at some stage of the compilation process.

SUPERCAPSULE: as opposed to Base Capsule ("normal" capsule). As the name implies, this is a "higher level" capsule. If data is requested which is obtained by accessing more than one entity, for example in a DB2 type Join, then this can be handled most efficiently using a supercapsule. Typically a supercapsule may be required for list screens where columns are to be retrieved from different Entities. A supercapsule may also be considered when reusability is an issue, e.g. building a screen header or database navigation across PARTITIONS.

TRANSACTION: an online process initiated by, and interacting with, a user which achieves some business objective.

VERSION: of Entities and of Methods. Entities may need enhancing by adding new DB columns and dropping obsolete ones, or by obtaining data from other tables. Similarly processing requirements will change. The XCALL environment, allows for methods and entities to have version numbers. For any given method version, the highest valid entity version numbers that may be associated with it are held on ODICT. In a transaction, a method version number may be specified (the default is to pick up the latest version at precompile time) and the appropriate versions of entities will be accessed.

XCIB: the XCALL Interface Block. This is the means of communication between the various components of XCALL: transactions, modules, XCALL itself, and the capsules which eventually access the database.

A general description of the present embodiment in functional terms will first be given, followed by a more detailed description of aspects of this embodiment.

ODICT

ODICT is a database (IBM Db2) that contains details of the data managed by a set of called programs—known as capsules. The capsules provide a number of services—known as methods. ODICT also contains details of these methods and the data required by and/or available from them.

The data consists of a number of entities, each of which has one or more attributes—known as columns. An entity has a name and a number (assigned for all time when the entity is defined to ODICT). A column has a name (unique within its entity), a data type, a length and a number (again assigned for all time when the item is added to ODICT).

Conveniently an entity contains one or more Db2 tables and/or (TRADE MARK OF IBM) records, though this is not essential.

Messaging in XCALL

At the centre of the XCALL run time architecture is the defined message block that is sent from a calling program to a called program and back again. The message block consists of control information in a fixed format control block, the XCIB (XCALL Interface Block), and an optional free format data area, the IRB (Intermediate Request/Response Block).

Part of the XCIB contains a list of the data items being passed from the calling program and a list of the data items it is requesting from the called program. These lists are expressed in terms of 'entity number' and 'column number'. These lists are called 'Map1', there is one for input and one for output.

Another part of the XCIB contains descriptions of the location and length of the data items listed in Map1, this is known as 'Map2'. There are two formats for Map2, one is used between a calling program and XCALL; the other is used between XCALL and the called program.

The XCIB has two portions. The 'Global' XCIB is used by the calling program, XCALL and the called program. The 'Local' XCIB has one set of contents when a call is passed to XCALL or when a response is returned to the caller; and another set when a call is passed from XCALL to the called program or a response is returned from the called program to XCALL. Map2 is part of the Local XCIB.

When data is passed from a calling program, it is moved from the data area of that program to the IRB. XCALL performs this function one column at a time for the specified number of rows for each entry in the input Map1. The length and location of the data items are obtained from Map2. Location is expressed in terms of the number of bytes from the beginning of a row to the start of the column. The Local XCIB contains the address of the first byte of each entity block used.

When XCALL receives a request it checks that the method requested exists and is available to the user. Some control information is added to the XCIB including the identity of the program (capsule) that contains the required method.

XCALL passes the call to the capsule. The precompiler generated code updates Map2 with the details of the current method's interface and then calls an XCALL service routine. This routine creates the data area for the capsule, moves data from the IRB into this area and sets up pointers to the entity blocks in the XCIB. The capsule's data area is known as the EBB (Entity Block Block) and contains one or more entity blocks.

The entity blocks are used by the capsule and may contain a response to be returned to the caller. When XCALL receives control back from the capsule, the XCIB is examined to see if there is any data in the EBB to be returned to the caller. If there is some, the previous Map2 process is reversed, using the output Map1 to overwrite the IRB.

To return this data to the calling program XCALL restores the Map2 originally passed by the caller and moves the data items from the IRB to the caller's entity blocks using Map2 and output Map1.

Precompiler

The precompiler 7 in FIG. 2 takes XCALL statements in a source program 8 and builds source statements from them using the contents of ODICT 6.

In a calling program this generated code sets up control information in the XCIB, including both Map1 and Map2, and then calls the XCALL run time program.

In a called program (capsule), the precompiler 7 generates code that validates the calls received from XCALL, sets up Map2, calls an XCALL service routine to get the data passed from the caller and then passes control to the section of the capsule appropriate to the specified method.

The precompiler builds definitions for the data areas for the 'entities' used in that program. In a calling program, the definitions contain only those entities and columns used specifically in calls from that program. In a called program, the definitions contain all entities and columns for which the capsule provides services. In both cases the data appears as a table for each entity. A table consists of one or more occurrences of a row of one or more columns. These tables are known as 'Entity Blocks'.

A call specifies only the service required (i.e. the method name), not the program being called or the system it is to be found in.

Version Independence

Both entities and methods are versioned within ODICT. A method may change in that the set of columns required for and/or available from it may change. Similarly, one or more columns may be added to or removed from an entity. In either case a group of such changes would constitute a new version.

The data type and length of a column, as identified by entity number and column number must never change. If a column changes length or format it must be assigned a new column number. The column name for the original can be reused for the new column and a new name assigned to the old format.

Together with the tailored entity blocks in calling programs this feature reduces the coupling of calling and called programs to a minimum.

The latest 'public' version of a method interface will be used when a calling program is compiled. When a capsule is compiled, the XCALL statements that define the method and entity version combinations that are valid are used to build validation code. If a capsule receives a request for an unsupported entity or method version it will be rejected by this generated code.

If an old calling program is recompiled it will pick up the latest public version of the entities it uses. Thus, if a column called 'POSTCODE' used to be 7 characters but is now 8, the program does not have to be changed to use the latest data format when it is next compiled. If it is acceptable, the capsule could recognise the request for the old column number and pass a truncated 7 character postcode. In this way the need to change both the called and calling program simultaneously would be avoided.

Distribution/Scalability

One of the reasons for using the IRB as an intermediary between the calling and called program is that this is a convenient part of the structure into which to insert a communications link between systems.

Where a capsule is physically separate from the program calling it, XCALL will pass the Global XCIB and the IRB to another instance of XCALL on the remote system. The remote XCALL passes data to and receives a response from the capsule in the same way as above using Map2 etc. The Global XCIB and IRB are returned to the 'home' XCALL which passes the response to the caller in exactly the same way as in the local case.

This means that calling and called programs that were formally on the same physical system can be made separate without the need to change them in any way whatsoever.

Aspects of the present embodiment will now be described in greater detail. As described above the present embodiment comprises memory means, ODICT 6, a message interface, XCALL 3, and also a precompiler 7, with reference to FIG. 2.

ODICT in Use

To support XCALL, ODICT is used at two stages. At compilation time, a precompiler takes COBOL source with embedded XCALL statements, and expands these into COBOL CALLs with the appropriate data fields included. The main data areas are the XCALL Interface Block (XCIB) which is the communication area for XCALL's own use, and an Entity Block to pass data to and from each Entity accessed by the application.

There are two types of Entity Block: the full Entity Block as called in to Capsules and included when using XC COPY statements for Module calls; and the tailored Entity Block generated within a Transaction or other code issuing XCALL Method statements. In this latter case, only those fields specified in the Input and Output clauses are included, thus reducing the size of data areas required at run time. In the case of several Methods acting on the same Entity, or several calls to the same Method with different Input and Output requirements, the precompiler generates a compound Entity Block comprising all the fields referenced.

To avoid confusion between the two types of Entity Block, the former is generally referred to as the Capsule Entity Block, or Full Entity Block, while the latter is usually termed the Entity Block or the Method Call Entity Block.

The second XCALL ODICT access is at the start of each day, when information regarding Capsules, Methods and Entities is extracted into Linear Datasets. These are used at XCALL run time to effect the final fixup between Method calls and Capsules. It is possible to use ODICT direct, but a performance overhead is suffered. Dissociating ODICT from run time use also allows closer control of implementation of ODICT updates.

ODICT XCALL Support Structure

Logical Objects

Figure 3:
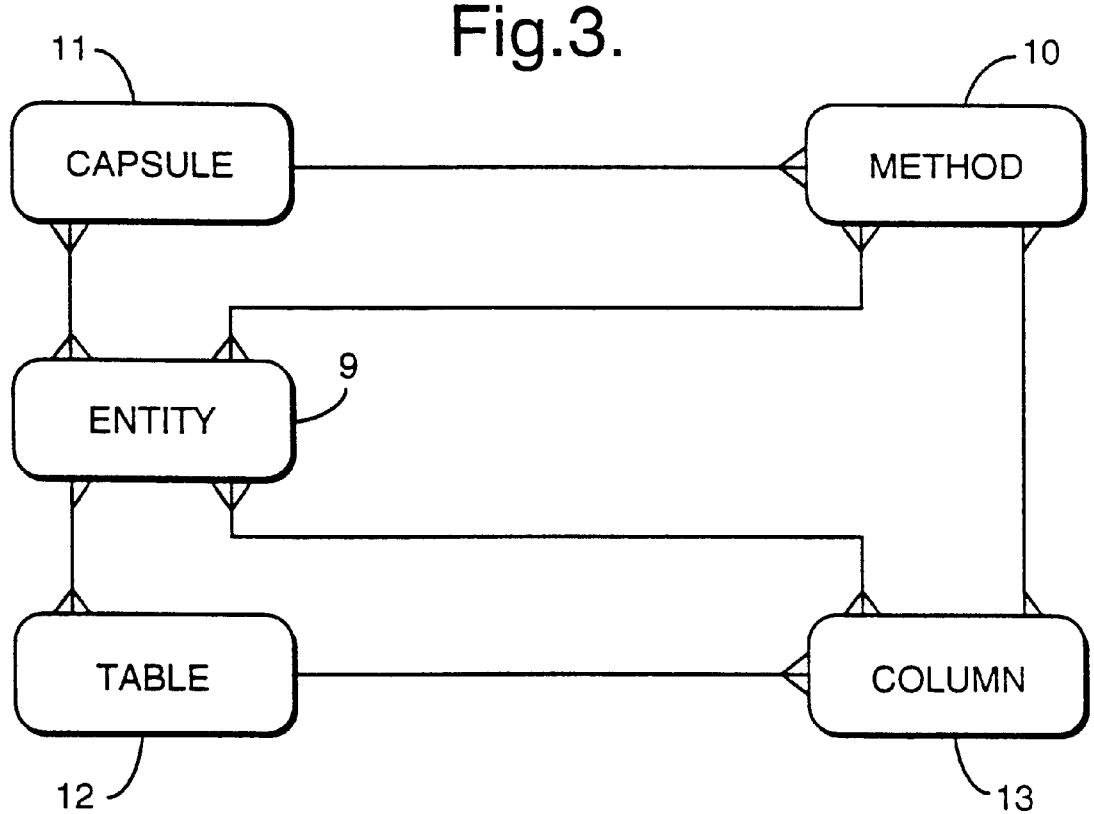
FIG. 3 is a schematic diagram showing the relationship between logical objects used by an embodiment of the present invention.

ODICT describes a number of logical objects used by XCALL. The main objects are Capsules, Methods, and Entities, which are described in more details below, with reference to FIG. 3

ENTITY 9

This is an identifiable type held on the database. This could be a DB2 table, or an (TRADE MARK OF IBM) record type, for example, representing a Product or it could be a composite structure, for example an Address record type with its associated Post Code, Post Town, Thoroughfare, Locality details, and so on, such an entity comprising data from a number of DB2 tables. Each entity will consist of a number of fields (columns), which will usually correspond to DB2 columns. Fields may be described as derived, i.e. calculated rather than held as physical data.

ODICT describes each Entity, identifying it by Entity Number. Each Entity has a Name of up to 18 characters which is used to create a group field name within the application. There is an abbreviation for prefixing columns with non-unique names (this is also used in constructing method names which process this entity) and two further prefixes for resolving name clashes.

METHOD 10

A method is called by a CICS or Batch program to carry out a function on an entity. In DB2 terms this would be to insert a new row on a table, or to retrieve, update or delete an existing row (but note that a method may also be used to operate on (TRADE MARK OF IBM) databases or other data storage sytems).

A calling program communicates with the method by supplying parameters to the method call. These include INPUT and OUTPUT data specifications, which link the entity field names with the calling program's data fields (in Working-Storage or Linkage).

Other parameters relate to the number of Entity instances returned, the number of input data fields in a supplied table, and so on.

Methods are uniquely identified by Method Name, a 30 character field, which is used in the method call. Methods are named according to purpose and use, notably in the use of a prefix (also known as the Action Type) to categorize the type of processing (GET, INS, MOD, DEL etc.). Against each Method ODICT stores the Capsule name, an Available for Use Indicator and return data limits details.

CAPSULE 11

A capsule usually groups methods which access a given entity. A special type of capsule, called a Supercapsule, groups methods which access a related set of entities. Applications programs call a method, and then XCALL uses ODICT data to associate the method name to the appropriate capsule.

Each Capsule has one entry which identifies it by Capsule Name, a five character field of which the first two indicate the associated application sytem. Other details held are an Availability for Use indicator and the Owner User Id.

TABLE 12

ODICT stores the structure of DB2 tables with entries for each column of each table. Each Entity will be supported by zero, one or more DB2 tables, and each table may support one or more entities.

COLUMN 13

ODICT has an entry for each column of each entity, whether DB2 or derived. This includes deleted columns (column numbers are never reused although a mechanism exists for reusing column names when, for example, the format has changed). Columns are identified by Column Number within Entity Number, and details of type and size are held against each column.

Entity Versions

Entities may need enhancing by adding new DB columns and dropping obsolete ones, by obtaining data from other tables or by otherwise modifying a column. For each entity, ODICT keeps an entry for each new version. Generally the latest version will be used, but an Available for Use indicator allows a new version to be entered and used in a test environment without disturbing production applications.

Method Versions

Similarly processing requirements will change. In particular, if the interface to a method changes, for example an input data field becoming mandatory or otherwise changing forrmiat, then a new method version will be required. For any given method version, the highest valid entity version numbers that may be associated with it are held on ODICT. In a transaction, a method version number may be specified (the default is to pick up the latest version at precompile time) and the appropriate versions of entities will be accessed.

DB2 Table Details

Figure 4:
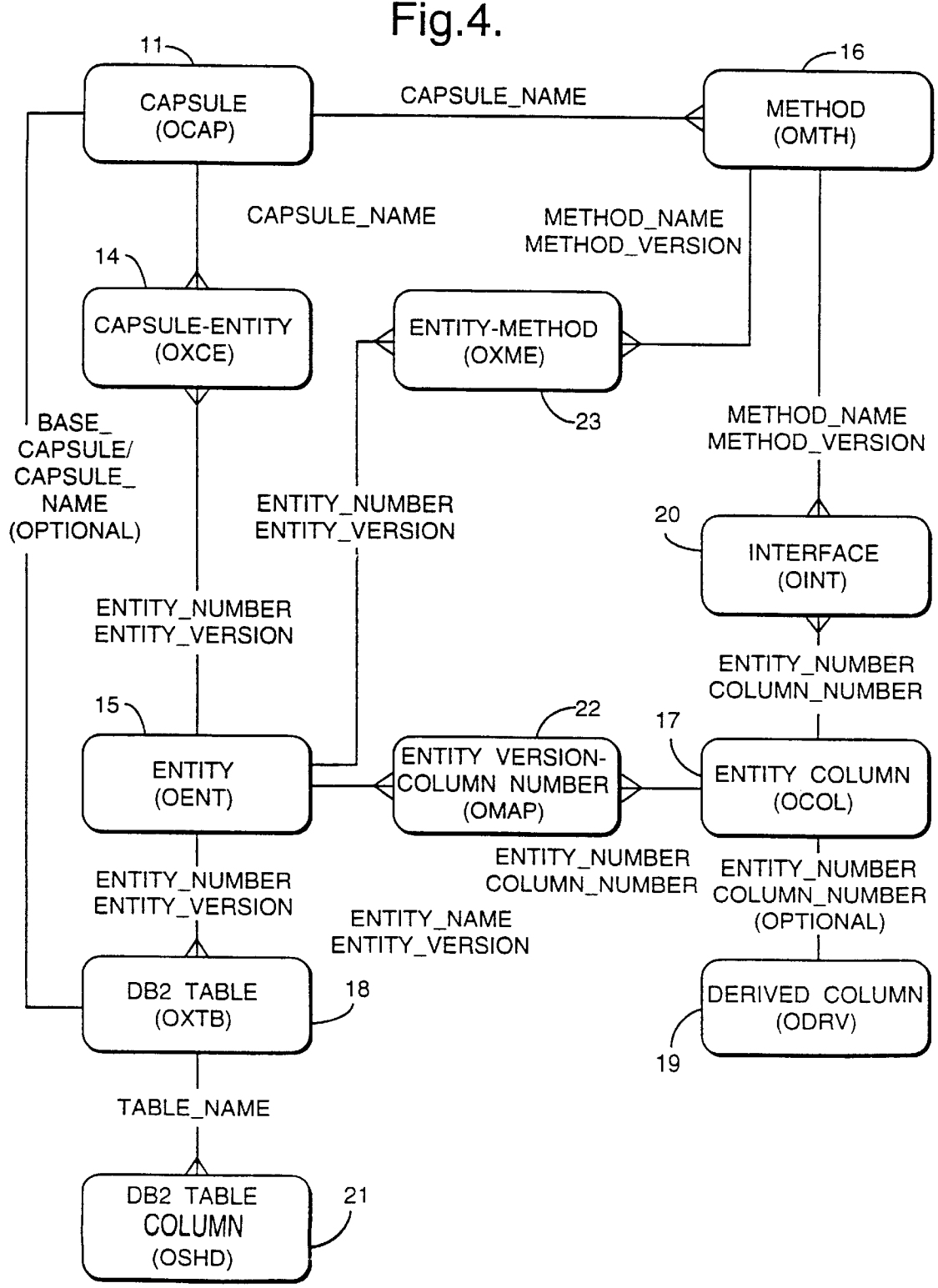
FIG. 4 is a schematic diagram showing the logical relationship between components of the memory means (ODICT) of an embodiment of the present invention.

The DB2 tables stored by ODICT are described with reference to FIG. 4.

CAPSULE (OCAP) 14

Capsule Table: contains one row per capsule.

| COLUMN NAME | TYPE | NOTES |
| --- | --- | --- |
| CAPSULE_NAME | Char(5) | Checked against Program-Id |
| AVAIL_FOR_USE | Char(1) | 'N', 'W', 'Y' |
| CAP_SECRTY_TYPE | Char(1) | |
| OWNER_USERID | Char(8) | Used when routing calls in Test Harness |
| UPDATED | Timestamp | |
| UPDATED_USERID | Char(8) | |
| CAPSULE_DBMS | Char(8) | |
| CAPSULE_ROUTER | Char(8) | |

ENTITY (OENT) 15

One row for each version of each entity. (Note that an entity may refer to more thane one DB2 table. Also indexed on Entity_Abbrev, Entity_version (enforced unique), and Entity_Name, Entity_Version (enforced unique)

| COLUMN NAME | TYPE | NOTES |
| --- | --- | --- |
| ENTITY_NUMBER | Smallint | Never changes |
| ENTITY_VERSION | Smallint | |
| ENTITY_NAME | Char(18) | Meaningful unique name, generates Entity Name in Entity Block within application. |
| ENTITY_ABBREV | Char(4) | Used to distinguish columns of the same names occurring in different entities, and also in the construction of Method Names. This should be unique within ODICT. |
| DB_PARTITION | Char(2) | Valid DB partition code |
| CAPSULE_PREFIX | Char(1) | Prefix used for Internal Method calls, currently 'I' |
| CAP2CAP_PREFIX | Char(1) | Prefix used for Capsule to Capsule calls, currently 'C' |
| AVAIL_FOR_USE | Char(1) | 'N' (initially), 'Y' |
| UPDATED | Timestamp | |
| UPDATED_USERID | Char(8) | |

METHOD (OMTH) 16

Generally one row per method version released, although ODICT synchronisation may introduce more. Each method belongs to one capsule. Once a method has been made available, a new version must be created for any change in the method.

Also indexed on Capsule_Name, Method_Name, Method_Version for relation with Capsule table (OCAP).

| COLUMN NAME | TYPE | NOTES |
| --- | --- | --- |
| METHOD_NAME | Char(30) | Constructed according to standards for naming methods. First part (Action Type) is 'GET', 'GETM', 'MOD' etc. Next part is the Entity Abbreviation. See XCALL Programmer's Guide Appendix B for full details. |
| METHOD_VERSION | Smallint | |
| METHOD_TYPE | Char(2) | 'RR', 'RU', 'UU', 'RL' depending on the Action Type |
| METHOD_TYPE_STATS | Char(1) | 'M', 'I', 'D', 'R' depending on Method_Type |
| CAPSULE_NAME | Char(5) | OMAP Foreign Key |
| DEF_TUPLES_BACK | Smallint | Default number of items returned. This will depend on the Action Type, i.e. 1 for a GET-type method, >1 for a GETM or GETN. |
| MAX_TUPLES_BACK | Smallint | Maximum number of items returned. This will never be less than Def_Tuples_Back. |
| AVAIL_FOR_USE | Char(1) | 'N' (initially), 'Y'. Note that 'Y' inhibits method deletion and permits a new version to be input. 'N' allows input of Derived Fields. |
| METHOD_DESCRIPTION | V240 | Narrative outline |
| UPDATED | Timestamp | |
| UPDATED_USERID | Char(8) | |

ENTITY COLUMN (OCOL) 17

One row for each column, whether DB2 or derived, used in current or previous entity version. Defines the attributes of each column.

| COLUMN NAME | TYPE | NOTES |
| --- | --- | --- |
| ENTITY_NUMBER | Smallint | |
| COLUMN_NUMBER | Smallint | Column no. within the Entity. This will not change, even if underlying table structures do. Deleted columns could at a later date be reused. |
| COLUMN_TYPE | Char(8) | CHAR, DATE, DECIMAL, INTEGER, SMALLINT, TIME, TIMESTMP, VARCHAR |
| COLUMN_LENGTH | Smallint | Used to calculate offset sizes in Entity Block |
| COLUMN_SCALE | Smallint | No. of Decimal pieces |
| COLUMN_NULLS | Char(1) | 'N', 'Y' |
| DELETED | Timestamp | Nulls allowed |
| DELETED_USERID | Char(8) | Nulls allowed |

DB2 TABLE (OXTB) 18

Shows Entity implementation by DB2 tables. (An Entity may be implemented by more than one DB2 table) Also indexed on Base_Capsule for relation to Capsule able (OCAP). There mey of course be no tables for a given Entity, e.g. for (TRADE MARK OF IBM) data.

| COLUMN NAME | TYPE | NOTES |
| --- | --- | --- |
| TABLE_NAME | Char(18) | |
| ENTITY_NUMBER | Smallint | OENT Foreign Key |

-continued

| COLUMN NAME | TYPE | NOTES |
| --- | --- | --- |
| ENTITY_VERSION | Smallint | OENT Foreign Key |
| BASE_CAPSULE | Char(5) | OCAP Foreign Key. Nulls allowed. Will always refer to an existing Capsule. |
| TABLE_PREFIX | Char(4) | |
| CREATOR_ID | Char(8) | System identifier, e.g. COSMOSS, TRAINING, OMS |

(ODRV) 19

One row for each derived field (a field which does not physically exist on a DB2 table, but which is either calculated or held on some other DBMS, e.g. (TRADE MARK OF IBM)). This information could have been held as an indicator column on OCOL, but it was felt that it may be necessary to hold more information later. Each row here will have an equivalent row on ENTITY COLUMN (OCOL)

| COLUMN NAME | TYPE | NOTES |
| --- | --- | --- |
| ENTITY_NUMBER | Smallint | OCOL Foreign Key |
| COLUMN_NUMBER | Smallint | OCOL Foreign Key |

INTERFACE (OINT) 20

Defines the interface block for each method version, i.e. the columns used by that version and whether they are mandatory for input or available for output. This is the Many-to-Many relationship between Entity Column and Method Version. Also indexed on Entity_Number, Column_Number for relation with Entity Column table (OCOL). Method_Name, Method_Version is used for 'Many' end of relationship with Method table (OMTH)

| COLUMN NAME | TYPE | NOTES |
| --- | --- | --- |
| METHOD_NAME | Char(30) | OMTH Foreign Key |
| METHOD_VERSION | Smallint | OMTH Foreign Key |
| TYPE_IFACE | Char(1) | Whether field is mandatory in this method: 'A' output (A)vailable, 'M' - input (M)andatory, 'O' - input (O)ptional |
| ENTITY_NUMBER | Smallint | OCOL Foreign Key |
| COLUMN_NUMBER | Smallint | OCOL Foreign Key |

DB2 TABLE COLUMN (OSHD) 21

Lists columns in current version of DB2 tables

| COLUMN NAME | TYPE | NOTES |
| --- | --- | --- |
| TABLE_NAME | Char(18) | DB2 table name |
| COLUMN_NAME | Char(16) | Column name within Entity (supplied via relationship with OXTB table) |
| DB2_COLUMN_NO | Smallint | |

ENTITY COLUMN TO ENTITY MAPPING (OMAP)

Lists the columns by name supported by each version of each entity and thus implements the many-to-many link between Entity and Entity Column. Holds a complete set of rows for all columns defined for use with the entity version, including columns no longer in use but required by old method version calls. ENTITY_NUMBER and COLUMN_NUMBER point to OCOL row holding details of the column. LAST_ENT_VER_USED holds ENTITY_VERSION of last entity version using this column.

This table is used by the XCALL precompiler to build the Entity Block for a given Entity Version. It also provides a name for the column, which can then be used in constructing a field name for use in an application.

Also indexed on Entity_Number, Column_Number for relationship with Entity Column table (OCOL). Entity_Number, Entity_Version used for 'Many' end of relationship with Entity tabled (OENT).

| COLUMN NAME | TYPE | NOTES |
| --- | --- | --- |
| ENTITY_NUMBER | Smallint | OCOL Foreign Key, OENT Foreign Key |
| ENTITY_VERSION | Smallint | OENT Foreign Key |
| COLUMN_NAME | Char(20) | |
| COLUMN_NUMBER | Smallint | OCOL Foreign Key. This is the Entity column number (as opposed to DB2 column no.) i.e. as specified in OCOL |

CAPSULE-ENTITY (OXCE)

Cross-references capsules and entities.

Also indexed on Entity_Number, Entity_Version

| COLUMN NAME | TYPE | NOTES |
| --- | --- | --- |
| CAPSULE_NAME | Char(5) | OCAP Foreign Key |
| ENTITY_NUMBER | Smallint | OENT Foreign Key |
| ENTITY_VERSION | Smallint | OENT Foreign Key |

ENTITY-METHOD (OXME)

Cross-references method versions and entity versions.

NB Primary Index is on Entity_Number, Entity_Version, Method_Name, Method_Version.

Also indexed on Method_Name, Method_Version, Entity_Number, Entity_Version.

Note that Methods can process more than one Entity as well as Entities being processed by more than one Method

| COLUMN NAME | TYPE | NOTES |
| --- | --- | --- |
| METHOD_NAME | Char(30) | OMTH Foreign Key |
| METHOD_VERSION | Smallint | OMTH Foreign Key |
| ENTITY_NUMBER | Smallint | OENT Foreign Key |
| ENTITY_VERSION | Smallint | OENT Foreign Key |

XCALL Runtime System

The actions of the XCALL runtime system can be sumarised as follows:

Transaction makes Method call

XCALL 'collects' IRB data from Transaction Entity Blocks

XCALL accesses Linear Dataset to find the capsule to call

IRB data 'presented' to Capsule

Capsule processed call

XCALL 'collects' IRB data from Capsule's Entity Blocks

XCALL returns data to Transaction's Blocks

The XCALL Runtime System will now be described in greater detail.

Back End

The lowest level layer of XCALL runtime, responsible for the call to the selected capsule, has the following functions:

| Request to Capsule | Request to XCALL |
| --- | --- |
| Pass XCIB and Request Message to Capsule | Establish Session on first call |
| On return Pass XCIB and IRB or Response Message back to Control and Continuity | Send XCIB and Request Message then wait On return receive XBIC and Response Message or IRB |

Capsule Call

A 'level 2' call, also known as a Capsule to Capsule call. If a capsule calls a method which is in a different capsule it needs to set up information in a separate XCIB. To avoid name clashes this is called the XC2B, and X2-prefixes rather than the XC-prefixes in the normal XCIB identify field-names correctly. It is also necessary to store more trace information and to keep track of further calls.

Control and Continuity(C/C)

The second level layer of XCALL run time, has the following functions:

Keeps track of Capsules called.

Records status of current call.

'Owns' DBMS threads/Run Units

Identifies appropriate Back End for remote Capsules

Passes request to Back End

Manages explicit Commit Requests—sending commits to remote XCALLs as necessary.

Front End

The first level layer of XCALL run time has the following functions:

| Request From Appl | Request From XCALL |
| --- | --- |
| Locate the Capsule that supports the method | Receive XCIB and Request Message |
| Pass control to C/C | Check this is the right place the pass to C/C |
| On return present data to caller | On return send XCIB and Response Message to calling XCALL |

Entity Block Block

This is the collective name for the Capsule Entity Blocks allocated at run time. An area of store is allocated to contain the largest amount of data expected back from the method call within the capsule and its size will be the total size of all capsule entity blocks managed by this capsule, multiplies by the number of rows requested.

IRB

The Intermediate Request/Response Block. This is the data area that is passed to and from a Capsule. It comprises the input or output data firelds concatenated to minimise space, i.e. with no account taken of Entity structure.

Local Call

A 'traditional' call to a capsule on the local node: XCALL can call the capsule directly from back end processing Map 1, Map 2A and Map 2B Data areas which hold details of the mapping of input and output data to and from the IRB.

Remote Call

A call to a remote capsule. This requires more complex processing and control. (Release 3.0 on).

Transaction Call

A standard call, using XCIB fields as control. The pre-compiler puts in the call to the appropriate entry point. It also calculates the IRB size as the larger of (rows requested*output row length) or (input rows supplied*input row length). The resulting value goes into XC-IRB-SIZE. Map 1 and Map 2A data will be preset by the time the call takes place.

XCCB

Control and Continuity Block.

XCCT

XCALL Capsule Table. This is loaded from LDS tables and holds details of each Capsule, including capsule status, ownership and location.

XCIB

The XCALL Interface Block. This is the means of communication between the various XCALL runtime components and calling processes. It contains such information as the Capsule and Method to be called, trace information, addresses of Enrtity Blocks and details on mapping the IRB to Entity Blocks.

XCMT

XCALL Method Table. This is loaded from LDS tables and at run time XCALL searches it with the method name as key, determining the capsule that contains it. XCMT also retains status and rows requested/returned details for the method.

XCNT

XCALL Node Table. This is loaded from LDS tables and holds details of each node.

Figure 5:
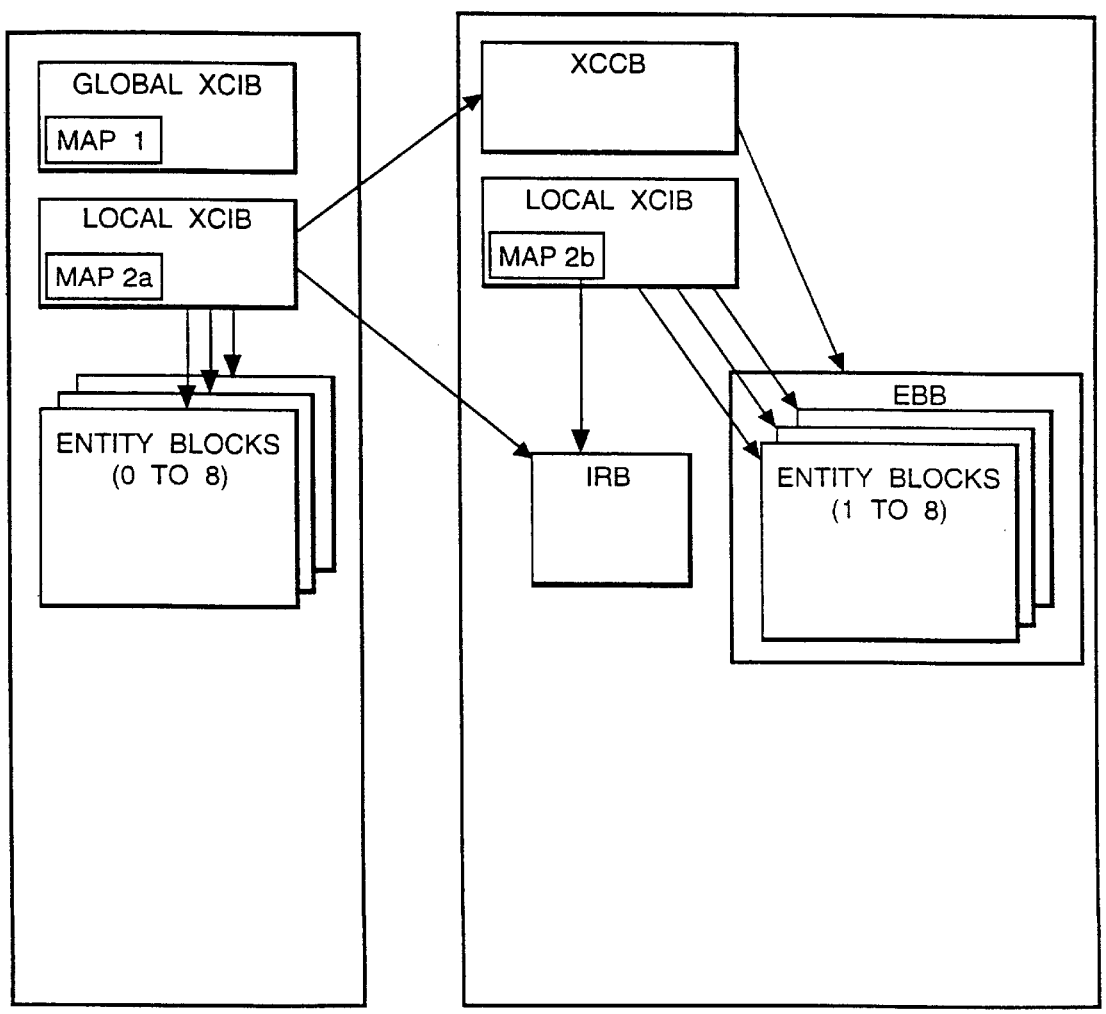
FIG. 5 is a schematic diagram showing the logical relationship between the control block structures utilized by an embodiment of the present invention.

The relationship between the control block structures utilized in XCALL is shown in FIG. 5.

XCALL STRUCTURE

Entry points

There are various entry points to XCALL, based on the environment in which the call takes place. These are permutations of: Transaction call/Capsule call (i.e. Capsule to Capsule); CICS Foreground/CICS Background/Batch; Local/Remote.

The three layers, Front End, Continuity & Control, and Back End

In each case, the entry points are supported by three layers of processing: Front End, Control and Continuity, and Back End, before the requested capsule is actually called.

Caller Processing

Precompiler-generated code loads Map1 and Map 2A data for mapping Caller Entity Block data to the IRB, calculates the size of the IRB and stores this and trace information in XCIB. Before calling the entry point input data is transferred to the Caller Entity Block field(s).

After each call to XCALL, the application must check the return code and behave accordingly. After control has been returned, the trace information is updated and any requested data put into the nominated output fields.

Entry Point

The main function of the entry point is to get addresses of the entity blocks that have been passed as parameters to the original call. Based on the number of significant parameters passed, entries in XCIB (XC-EM-ADDR) are set to these addresses. In addition, checks on things such as the environment take place.

Front End.

This receives requests from application programs (and from remote systems on behalf of a remote application). It captures appropriate security information and maintains a trace of the calls received. It is also responsible for mapping the IRB to the Caller Entity Block(s). When XCALL is called, the front end acquires storage from the operating system by executing a GETMAIN for the IRB, using either a CICS GETMAIN or an Assembler equivalent for Batch. The size of the space obtained is then held in XC-CURRENT-IRBSIZE.

On a subsequent call, the XC-IRB-SIZE is set again by the precompiler inserted code in the caller. The front end compares this with XC-CURRENT-IRB-SIZE. If the current size is greater than or equal to the size requested no further action is necessary, otherwise the current space is released with FREEMAIN and a new IRB obtained with GETMAIN again.

Various administrative and security actions now take place to:

Increment the XCIB trace pointer and move the current request information into the new trace entry;

Set the XCIB caller's node and task number fields;

Use the XCMT to check the method name is valid, get the capsule name (taking account of possible use of the Test Harness) and that the capsule (if a local one) is available for the type of request (if not set the appropriate SWE code and return to the caller);

Get the node from the XCCT and set the node id into the XCIB;

Get the security information (userid from middleware) and perform a checksum to generate a security check field;

Create the primary XCCB on the first call for a task.

Store XCCB details: addresses of run time tables etc., and capsule to capsule call information as appropriate.

Front End then stores the request data from the caller and puts it into the IRB, calling Assembler routine XC700UAS to do this (see the section below on Map 1 and Map 2 Processing for a detailed description). XCIB details are stored in XCCB.

After calling Continuity and Control, Front End deals with capsule to capsule call processing, copying details back into the appropriate XCIB fields.

It then calls Assembler routine XC703UAS which is essentially XC700UAS in reverse, to transfer data from the returned updated IRB into the Caller Entity Block(s). If Commit processing is required, it takes place here, otherwise control passes back to the entry point, and thence to the caller.

Control and Continuity.

This maintains details of the capsules that an application calls. It uses the XCCT to pass requests to the appropriate capsule. It is responsible for handling Backouts and Comrnits explicitly requested by the caller or Backouts caused by error handling requirements.

Backout/Commit calls invoke checking of DBMS type against each capsule so far called by this transaction, before the requested action takes place.

If the call is not a Backout or Commit, then C&C proceeds assuming a method call.

If the capsule called is not in the XCCB, the XCCT is used to locate the system the capsule resides in and the type of back end (communications access method or local) that should be used to talk to the remote system.

Update accesses are checked, and then call statistics updated. If call limits have not been exceeded, C&C passes control to Back End.

On return from Back End, C&C checks that the XCIB has not become corrupted and updates XCCB statistics for this capsule. If the return SWE code is 8 or higher then backout occurs.

Finally, control is returned to Front End.

Back End

Calls the appropriate capsule, which may be the Stable version or a Working Copy or a Stub (these last two are when testing). It stores the local part of the XCIB into the save area in the XCCB, and passes control to the capsule.

On return, it checks that nothing has been corrupted and that the rows returned value is OK. Before restoring the local XCIB it builds the IRB with the data to be returned to the caller, using Assembler routine XC702UAS (see Map 1 and Map 2 Processing below).

Control then returns to C&C.

Capsule Processing

The precompiler generates code to store capsule details in the XCIB and check that the method is valid and that the required message data has been passed.

It then unravels the IRB data presented, using Assembler routine XC701UAS. If this is the first time this capsule has been called then XC704TCS is used to get store for the Entity Block Block. This consists of all the Capsule Entity Blocks, occurring as many time as necessary (XC-ROWS-REQUESTED).

After setting the Capsule Entity Block addresses into the XCIB the capsule then performs the requested method, updates the XC-SWE-CODE and XC-ROWS-RETURNED fields in XCIB, after which control returns to the back end.

MAP 1 AND MAP2 PROCESSING

Data areas managed by Map 1 and Map 2

As mentioned above, data is passed around the various parts of XCALL using three areas (excluding any other source or destination data fields):

The Caller Entity Block which is the tailored block comprising just those fields referenced by this caller. This is built up on a Caller basis: an entity block may well contain fields that are there as a result of several different calls referencing different fields. Additionally, if calls indicate that arrays are required then the OCCURS clause will be the maximum for that entity found by the precompiler. In these ways the entity blocks are no larger than necessary.

The Capsule Entity Block which is the full entity block comprising all fields, whether database or derived, defined as being not deleted for this version of the entity.

The Intermediate Request/Response Block (IRB) where data is packed and unpacked for each individual call.

Control of the various moves required is by map tables which identify and locate the source and destination fields. There are three such maps MAP 1 contains entries each part of which identifies input and output data respectively: effectively there are two lists, one for input and one for output. The precompiler generates the Entity and Field Numbers for each field that is mentioned in an INPUT or an OUTPUT clause in a particular XCALL call. There is no implicit relationship between the input and output specifications: there may for example be only one significant input entry and many output entries. An entry set to zero indicates the end of each list. There is a Map 1 entry for each column referred to in a given call i.e. in the Input and Output clauses. Each list is terminated by zeroes. There is no relationship between the input and output elements in each occurrence: there may be only one significant input entry and several output entries, for example. The values in this (and Map2 format A) are loaded by precompiler generated code.

MAP 2 version A links the IRB data to the caller entity block. There is a one-to-one relationship between entries on this map and those on Map 1. As in Map 1, each entry has an Input and an Output part. No particular indication of the end of each list is required: this can easily be derived from Map 1. The details are loaded by the precompiler, and XCALL saves values before passing control to the capsule, restoring them when the IRB has been rebuilt with returned data.

MAP 2 version B shares the same physical data area, values being loaded in by precompiler-generated code executed within the capsule. Whereas Map 2A is concerned with thetaller entity block, Map 2B links the IRB data to the Capsule Entity Block. There is thus one entry for each field in that entity version not marked as deleted. Map 1 is still needed: data movement between the IRB and the Capsule Entity block is dependent on the existence of a significant Entity/Field number combination on Map 1 matching the equivalent entry on Map 2B.

Example of MAP1/MAP2 Processing

In this example the manipulation of input and output is demonstrated for a simple method call which receives supplies two input keys, and receives a row back for each. Although somewhat simplistic, careful study of the data at each stage should reveal the details of IRB/Entity Block interaction.

The entity—PARROT—has the attributes shown in the table below and is described in the dictionary (ODICT). The particular method call requests only a subset of the available columns: the others are included for illustration.

Entity Details (from ODICT)
Entity Number 500 Version 1
Entity Name PARROT
Entity Abbreviation PARR
Column Details

| Col no | Name | Type | Length |
|---|---|---|---|
| 1 | CODE | Char | 4 |
| 2 | NAME | Char | 20 |
| 3 | SIZE | Smallint | 2 |
| 4 | COLOUR | Char | 8 |
| 5 | FEED | Char | 10 |
| 6 | WEIGHT | Smallint | 2 |

NB Type Char=Character, Smallint=small integer (binary in the range 1–32767)

XCALL statement
XCALL GETN-PARR

| INPUT (PARR-CODE FROM WS-PARR-CODE(*)) | | | |
|---|---|---|---|
| OUTPUT | (PARR-CODE | INTO | WS-PARR-CODE(*); |
|  | PARR-NAME | INTO | WS-PARR-NAME(*); |
|  | PARR-WEIGHT | INTO | WS-PARR-WEIGHT(*)) |
| ITEMS(2,2) | | | |

END-XCALL

Capsule View of the Data (Entity Block)

Consists of a number of Occurrences (Rows) of all of the attributes of the entity (columns)

| Column Name | Column Type | Column Length |
|---|---|---|
| I-PARR-CODE | Char | 4 |
| I-PARR-NAME | Char | 20 |
| I-PARR-SIZE | Smallint | 2 |
| I-PARR-COLOUR | Char | 8 |
| I-PARR-FEED | Char | 8 |
| I-PARR-WEIGHT | Smallint | 2 |

(Total length of row: 44 bytes)

Caller View of the Data (Entity Block)

Consists of a number of Occurrences (Rows) of all of the attributes of the entity (columns)

| Column Name | Column Type | Column Length |
|---|---|---|
| I-PARR-CODE | Char | 4 |
| I-PARR-NAME | Char | 20 |
| I-PARR-WEIGHT | Smallint | 2 |

(Total length of row: 26 bytes)

Processing Details

Tables updated before XCALL call executed:

Map 1:

| Input Entity No | Input Field No | Output Entity No | Output Field No |
|---|---|---|---|
| 500 | 1 | 500 | 1 |
| 0 |  | 500 | 2 |
|  |  | 500 | 6 |
|  |  |  |  |

Map 2A:

| Input Base | Input field offset | Input field length | Output Base | Output field offset | Output field length |
|---|---|---|---|---|---|
| 1 | 0 | 4 | 1 | 0 | 4 |
|  |  |  | 1 | 4 | 20 |
|  |  |  | 1 | 24 | 2 |

Caller Entity Block (assuming ws-fields set up by program)

| PARR-CODE | PARR-NAME | PARR-WEIGHT |
|---|---|---|
| MC01 | | |
| CK01 | | |

Processing

Front end called: XC700UAS called to move data from Method EB to IRB: string each input field on Map1 (processing stops when a zero-filled field is met) into the IRB. For input arrays, stringing is on a row-by-row basis. The fields used in calculation are the offset and length within the caller entity block, held in Map 2A, and the address of the entity block (originally passed as a parameter to the original call to XCALL) and the length of the entity block row held in XCIB). The offset is from the beginning of the row, which is incremented by the row length for subsequent rows.

IRB CONTENTS

| MC01 | CK01 | | | |
|---|---|---|---|---|
| | | | | |
| | | | | |

IRB data used to update Capsule entity block: done by XC701UAS, using Map 1 and Map 2B details Map 1 contaings the Entity and Field no of input data. From Map 2B data it is possible to determine the length of each input field, matching the Entity and Field number with that of the Map 1 entry. From the same Map 2B entry the offset within the full entity block is available. The addresses of the full entity blocks are set up following acquisition of main store.

| PARR-CODE | PARR-NAME | PARR-SIZE | PARR-COLOUR | PARR-FEED | PARR-WEIGHT |
|---|---|---|---|---|---|
| MC01 | | | | | |
| CK01 | | | | | |
| | | | | | |

Capsule does its work and populates Entity block (assume all fields are marked as available for output: this method call only requires subset)

| PARR-CODE | PARR-NAME | PARR-SIZE | PARR-COLOUR | PARR-FEED | PARR-WEIGHT |
|---|---|---|---|---|---|
| MC01 | MACAW | 10 | BLUE | NUTS | 25 |

| CK01 | COCKATOO | 8 | WHITE | FINGERS | 20 |
|---|---|---|---|---|---|
| | | | | | |

The XCIB will be updated to indicate that 2 rows are to be returned (XC-ROWS-RETURNED set to 2).

IRB filled by XC702UAS: Map 1 again tells us which output entity/field combinations are required, Map 2B where they are in the Capsule Entity block:

| MC01 | MACAW | 25 | CK01 | COCKATOO | 20 |
|---|---|---|---|---|---|
| | | | | | |
| | | | | | |

Method Entity Block updated by XC703UAS, using Map 1 and Map 2A, whose values have been restored by Back End processing:

| PARR-CODE | PARR-NAME | PARR-WEIGHT |
|---|---|---|
| MC01 | MACAW | 25 |
| CK01 | COCKATOO | 20 |

Figure 6:
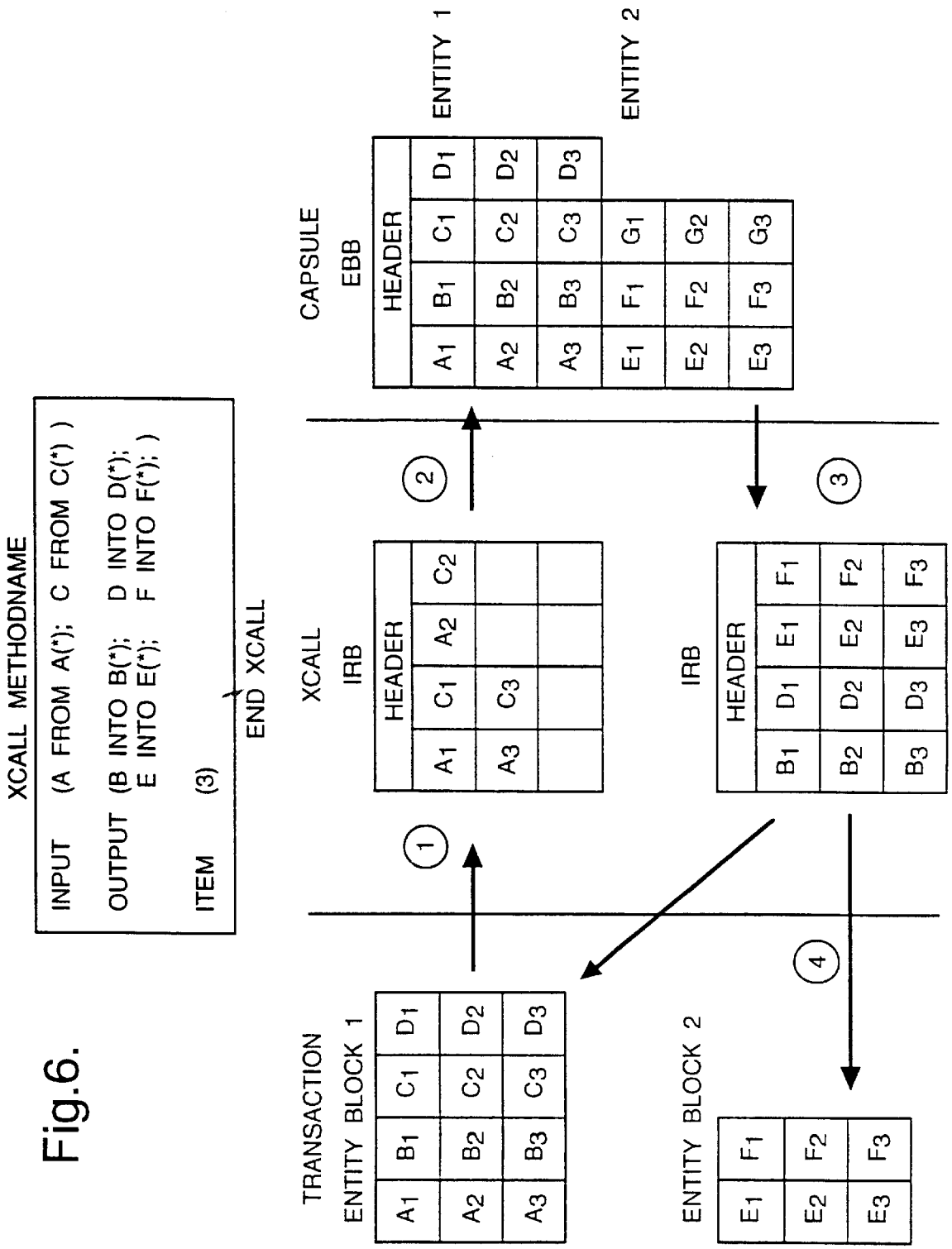
FIG. 6 is a schematic diagram showing an example of a call to a capsule from a transaction which utilizes an embodiment of the messaging system of the present invention.

The processing performed by the various application and XCALL layers in the execution of a single call to a capsule, are now described with reference to FIG. 6. The four processes, labelled 1, 2, 3 and 4 in FIG. 6 are described first.

XC700UAS (process 1 in FIG. 6)—BUILD IRB FROM APPLICATION ENTITY BLOCK(S)

Initialise the IRB Header.

Start processing at the first input field entry in MAP1, continue until a column number of zero is found or entry 255 is processed. Perform the process once for each input row.

Calculate the location to move from by . . .
  a) Retrieve the address of the beginning of the entity block from the XCIB entity details array entry pointed to by the current Map2*a* entry.
  b) Subtract 1 from the number of the current row, multiply it by the length of a row (indicated in the entity details array) and add the result to the address retrieved above.
  c) Add to the result the number of bytes into a row to the start of the field (held in the current Map2*a* entry).

Move the number of bytes indicated in the field length in the current map2*a* entry from the start address calculated above to the next free position in the IRB. increment the next free position in the IRB by the number of bytes moved.

Note that Map2*a* entry n corresponds to Map1 entry n.

XC701UAS (process 2 in FIG. 6)—BUILD EBB DATA FROM IRB

Initialise the EBB Header.

Process each INPUT Map1 entry in order until an entity number of zeroes is encountered or entry 255 is processed. Repeat the process the number of input rows times.

Find the entry in Map2*b* that matches the entity number & column number for the current Map1 INPUT entry. (Note—both are in ascending column number within entity number order.)

Calculate the location to move to by . . .
  a) Retrieve the address of the beginning of the entity block from the XCIB entity details array entry pointed to by the current Map2*b* entry.

b) Subtract 1 from the number of the current row, multiply it by the length of a row (indicated in the entity details array) and add the result to the address retrieved above.
c) Add to the result the number of bytes into a row to the start of the field (held in the current Map2*b* entry).

Move the number of bytes indicated in the field length in the current map2*b* entry from the next position to be moved from in the IRB to the start address calculated above in the capsule entity block. Increment the next position to move from in the IRB by the number of bytes moved.

XC702UAS (process 3 in FIG. 6)—BUILD IRB FROM CAPSULE ENTITY BLOCK(S)

This performs the same processing as XC701UAS, but in reverse. The Map1 and Map2*b* process produces the address to move from in the capsule's entity block(s) and data is moved into the IRB overwriting the input data.

XC703UAS (process 4 in FIG. 6)—BUILD APPLICATION ENTITY BLOCK(S) FROM IRB.

This performs the same processing as XC700UAS, but in reverse. The Map1 and Map2*a* process produces the address to move to and data is moved from the IRB overwriting the existing contents of the application's entity block(s).

Application—'Normal' Code.
1. The application puts the input data to be sent to the method into the variables mentioned in the right hand side of the INPUT in the XCALL statement.

Application—Precompiler Generated Code
2. Update Map1 in the XCIB with the entity and column (field) numbers of the columns mentioned in the left hand side of the XCALL statement (Input and Output). Store entity details in the XCIB. Set the number of input rows supplied and the number of response rows requested in the XCIB.
3. Update Map2*a* with the entity subscript, offset and length of the columns mentioned in Map1. Update the XCIB with the size of IRB required for this method call.
4. Move the variables mentioned in the right hand side of the INPUT in the XCALL statement into the entity block variables representing the fields mentioned on the left hand side of the XCALL statement.
5. Update the XCIB with details of the program making the call.
6. Call the XCALL program relevant to the environment in which this program is executing. Pass the XCIB, the entity blocks required for INPUT and OUTPUT fields.

XCALL—Front End
7. Update the Local XCIB with details of the entity blocks passed.
8. Access the control storage tables that define methods, capsules, nodes and the relationship between them (as defined in ODICT). Validate the method exists and update the XCIB with the Capsule Id for the method and the Node Id for the Capsule.
9. If this is the first call in this 'task'—get storage for the XCCB and update the XCIB with details of the calling task. If there is no IRB or the current one is too small—get storage for the IRB.
10. Call XC700UAS.

XCALL—XC700UAS
11. Move the input data (as listed in Map1 in the Global XCIB and described in Map2*a* in the Local XCIB) from the callers entity block(s) into the IRB.
12. Return to Front end.

XCALL—Front End
13. Call Continuity and Control Layer

XCALL—Continuity & Control Layer
14. Check that the caller has access to the capsule for the required level (read only access etc). Update the call statistics in the method and capsule control tables.
15. Call Back end.

XCALL—Back End
16. Save the Local XCIB.
17. Call the Capsule program

Capsule—Precompiler Generated Code (XC ENTRY statement expansion)
18. Check that the method name, method version, entity number(s) and entity version(s) passed in this call are valid (as defined in ODICT and RECEIVE statements when the capsule was precompiled).
19. Call XC701UAS.

XCALL—XC701UAS
20. Check that the current EBB size is sufficient for the current call. If not update the XCCB with the size of EBB required, set the return code and return to the capsule (i.e. continue at 23 below).
21. Set the addresses) of the entity block(s) within the EBB in the Local XCIB.
22. Move the input data (as listed in Map1 in the Global XCIB and described in Map2*b* in the Local XCIB) into the capsules entity block(s) from the IRB.
23. Return to the capsule.

Capsule—Precompiler Generated Code (XC ENTRY statement expansion)
24. Check the return code. If EBB was not big enough—call XC704TCS otherwise continue at 28 below.

XCALL—XC704TCS,
25. If there is an existing EBB release the storage. Acquire storage for an EBB of the size indicated in the XCCB.
26. Return to the capsule.

Capsule—Precompiler Generated Code (XC ENTRY statement expansion)
27. Call XC701UAS.

Continue at 20 above.

Capsule—Precompiler Generated Code (XC ENTRY statement expansion)
28. Pass control to the specified Method code.

Capsule—Method code
29. Process the input data in the entity block(s) and create response (output) data in the entity block(s). Update the XCIB with the number of rows returned.
30. Return to XCALL XCALL—Back End
31. If the capsule has returned data—call XC702UAS. Otherwise continue at 34 below.

XCALL—XC702UAS
32. Move the output data (as listed in Map1 in the Global XCIB and described in Map2*b* in the Local XCIB) from the capsules entity block(s) to the IRB.
33. Return to the Back End.

XCALL—Back End.
34. Restore Local XCIB from the saved copy taken at 16 above.
35. Return to Continuity & Control XCALL—Continuity & Control
36. Update the response statistics in the method and capsule control tables.
37. Return to Front End.

XCALL—Front End
38. If the capsule returned data—call XC703UAS. Otherwise continue at 41 below.

XCALL—XC703UAS
39. Move the output data (as listed in Map1 in the Global XCIB and described in Map2*a* in the Local XCIB) to the callers entity block(s) from the IRB.
40. Return to Front end.

XCALL—Front End

41. Return to Application.

Application—Precompiler Generate Code

42. If the capsule returned data—move the output data from the entity block(s) to the variables mentioned on the right hand side of the INPUT in the XCALL statement.

Application—'Normal' Code

43. Process response—make further XCALLs etc.

This example demonstrates how the use of the XCALL messaging system has allowed version independence between the transaction and the capsule. The transaction view of the data in entity 1 and 2 is of entity 1 having variables A to D and entity 2 having variables E and F. The capsule's view of the data is that entity 1 has variables A to D but entity 2 has variables E to G. This may for example arise if an additional variable G has been added to the database (which is accessed via the capsule), which the transaction is unaware of. This may for example occur if variable G is added to the database after the transaction has been written. Given these differing views of the data between the transaction and the capsule, if XCALL were not used, i.e. if a normal linkage between the transaction and the capsule was used, a problem would be encountered when entity 2 is accessed. As this entity is read, when $E_2$ is reached the capsule would actually access $F_2$ rather than $E_2$, and $E_2$ rather than $G_1$. Thus the incorrect data would be passed back to the transaction. As described above, by utilizing XCALL and an intermediate IRB, the transaction and the capsule can each have their own view of the same entities and yet consistently and correctly access these entitities by communicating their views of the data via MAP2*a* and MAP2*b* to XCALL.

REMOTE CALL PROCESSING

In XCALL, if the control and continuity layer detects that the request is for a capsule on a remote machine, instead of calling the standard back end to do the capsule call, it calls a new back end. The new back end will have to pass the request to the remote system.

Instead of directly calling a capsule on the remote system, the new back end will call a new XCALL server program on the remote system. This also does static links to three programs, the front end, the control and continuity layer, and the back end. In this new server, only the front end is new.

If control is received from a remote system, the XCIB will be all that is received initially (at least by XCALL if not the system). Based on the capsule details held locally, it will acquire storage for the request and response blocks and update the local portion of the XCIB. The following checks are made before control is passed to the next layer.

i) If this is a new local task, save the calling task number. If not check that the task is the same.

ii) Check that the capsule is local and perhaps check that a routing by key agrees with the local routing table.

iii) Perform local security checking against remote system and userid.

Check the security check field is correct.

When the request was from a remote system, it is the front end that sends the updated XCIB and the appropriate IRB and response blocks back to the requester's system. The RLEN fields in the response blocks will indicate if and how much data should be sent for each of them. When all appropriate data has been sent, it will free the storage the blocks occupied (apart from the XCIB and XCCB probably) and wait for the next request.

What is claimed is:

1. A messaging system for passing messages between calling programs and called programs, said system comprising:

a central message interface which passes all messages within a defined message block;

the central message interface having memory means for storing an identifier and a program interface for each called program, the message block including a fixed format control block and a data area having a free format, the control block including a first portion carrying data entity keywords and a second portion carrying characteristics of data items, the said first portion remaining unaltered when a message block is passed between the central message interface and a called program or a calling program and said second portion being altered by said central message interface dependent on the destination of the message block; and wherein, in use, the central message interface:

i) receives a message block from a calling program of a plurality of calling programs each of which is capable of providing a message block to said central message interface, said message block containing an identifier;

ii) associates the identifier with a particular called program and a particular program interface; and iii) sends a message block to the particular called program utilizing the particular program interface, the particular called program being one of a plurality of called programs each of which is capable of receiving a message block from said central message interface.

2. A messaging system as in claim 1, wherein:

each of the called programs is associated with a data entity, each data entity has a plurality of data items and a unique data entity keyword, and the memory means of the message interface stores each data entity keyword.

3. A messaging system as in claim 1 wherein:

the said characteristics of data items carried in the second portion of the control block include the location and length of the data items, and a unique data item tag for each data item is carried in the first portion of the control block.

4. A messaging system as in claim 1 wherein:

data items are carried between called and calling programs within the data area of the message block.

5. A messaging system as in claim 1 wherein:

data items are transferred from the calling program one at a time and to the called program one at a time.

6. A method of passing messages between calling programs and called programs via a message interface including a memory storing (i) an identifier for each called program and (ii) a program interface for each called program, said method comprising:

(A) receiving messages containing identifiers of particular programs to be called, said messages being within a defined message block including:

A(i) a control block in fixed format having (a) a first portion for carrying data entity keywords, and (b) a second portion for carrying characteristics of data items, and A(ii) a data area in free format;

(B) associating a particular called program with the received identifier;

(C) retrieving the program interface of the particular called program;

(D) producing an updated message block in which the first portion of the control block remains unaltered and the second portion of the control block and data contained in the data area are altered to conform to the requirements of the called program; and (E) transmitting the updated message block to the particular called program.

7. A method of passing messages from calling programs to a message interface and from said message interface to called programs wherein said transmissions are carried out in a defined message block including:

(i) a control block in fixed format having
 (a) first portion for carrying data entity keywords, and
 (b) a second portion for carrying characteristics of data items, and (ii) a data area in free format; wherein the transmission of each message comprises:

(A) with an original calling program, preparing data for transmission within an instance of said message block and transmitting said message block together with an identifier of a particular called program to the message interface;

(B) with the message interface, identifying the particular called program and updating the message block received from the original calling program into a message block compatible with the particular called program and transmitting said updated message block to said particular called program, said identification and updating being carried out using information stored at the message interface; and (C) with the particular called program, converting the updated message block into its own requirements.

8. A method as in claim 7 which also includes:

(D) with the particular called program, preparing data for a reply within another instance of said message block and transmitting said message block to the message interface;

(E) with the message interface, identifying the original calling program and updating the message block received from the particular called program into a message block compatible with the original calling program and transmitting said updated message block to said original calling program, said identification and updating being carried out using information stored at the message interface; and (F) with the original calling program, converting the updated message block into its own requirements.

9. A method as in claim 7 wherein the original calling program includes data items for passage to the particular called program in the data area of the message block.

10. A method as in claim 8 wherein the particular called program includes data items requested by the original calling program in the data area of the message block.

11. A message interface for passing messages between calling programs and called programs, said message interface comprising:

memory means for storing
 (i) an identifier for each called program, and
 (ii) a program interface for each called program;

wherein all messages include identifiers of a particular called program and are received within a defined message block which includes:

(i) a control block in fixed format having
 (a) first portion for carrying data entity keywords, and
 (b) a second portion for carrying characteristics of data items, and (ii) a data area in free format; said message interface being adapted:

(A) to associate a particular called program with a received identifier, (B) to retrieve the program interface of the particular called program, (C) to produce an updated message block in which the first portion of the control block remains unaltered and the second portion of the control block together with any data contained in the data area are altered to conform to the requirements of the called program, and (D) to transmit the updated message block to the particular called program.

12. A messaging system for passing messages between calling programs and called programs, said system comprising:

a message interface passing all messages within a defined message block and via a message interface;

said message interface having memory means for storing, for each called program, an identifier and a program interface, the message block including a data area having a free format and a control block, having a fixed format including a first portion for carrying data entity keywords and a second portion for carrying characteristics of data items, said first portion remaining unaltered when a message block is passed between the message interface and a called program or a calling program, and said second portion being altered dependent on the destination of the message block; and wherein, in use, the message interface:

i) receives a message block from a calling program containing an identifier;

ii) associates the identifier with a particular called program and a particular program interface; and iii) sends a message block to the particular called program utilizing the particular program interface.

13. A message system as in claim 12 wherein:

each of the called programs is associated with a data entity, each data entity has a plurality of data items and a unique data entity keyword; and the memory means of the message interface stores each data entity keyword.

14. A messaging system as in claim 13 wherein:

said characteristics of the data items carried in the second portion of the control block include the location and length of the data items, and a unique data item tag for each data item is carried in the first portion of the control block.

15. A messaging system as in claim 14 wherein data items are carried between called and calling programs within the data area of the message block.

16. A messaging system as in claim 15 wherein data items are transferred from the calling program one at a time and to the called program one at a time.

* * * * *